United States Patent
Zhuo et al.

(10) Patent No.: US 11,148,868 B2
(45) Date of Patent: Oct. 19, 2021

(54) CASE AND A METHOD FOR PROTECTING A PEARL, AND AN APPARATUS FOR ENCASING A PEARL

(71) Applicant: Linan Zhou, Auckland (NZ)

(72) Inventors: Shen Jia Zhuo, Auckland (NZ); Qihui Zhou, Auckland (NZ)

(73) Assignee: Linan Zhou, Auckland (NZ)

( * ) Notice: Subject to any disclaimer, the term of this patent is extended or adjusted under 35 U.S.C. 154(b) by 0 days.

(21) Appl. No.: 16/746,346

(22) Filed: Jan. 17, 2020

(65) Prior Publication Data
US 2020/0391926 A1 Dec. 17, 2020

(30) Foreign Application Priority Data
Jun. 14, 2019 (NZ) ........................................ 754581

(51) Int. Cl.
| A45C 11/04 | (2006.01) |
| B65D 81/20 | (2006.01) |
| B65D 81/24 | (2006.01) |
| A45C 11/16 | (2006.01) |

(52) U.S. Cl.
CPC ......... *B65D 81/2069* (2013.01); *B65D 81/24* (2013.01); *A45C 11/16* (2013.01)

(58) Field of Classification Search
CPC ...... B65D 81/2069; B65D 81/24; A45C 11/16
USPC .......... 206/6.1, 1.5, 566, 807; 220/324, 326, 220/265
See application file for complete search history.

(56) References Cited

U.S. PATENT DOCUMENTS

| 4,453,636 | A | * | 6/1984 | Meadows | B65D 55/02 206/221 |
| 4,595,095 | A | * | 6/1986 | Lam | A45C 11/16 206/6.1 |
| 4,687,117 | A | * | 8/1987 | Terauds | B65D 43/0212 220/781 |
| 5,590,779 | A | * | 1/1997 | Ramsey | A45C 11/16 206/459.1 |
| 2007/0045317 | A1 | * | 3/2007 | Rosender | B65D 43/162 220/266 |

(Continued)

FOREIGN PATENT DOCUMENTS

| BE | 816108 | 9/1974 |
| CN | 105 265 353 | 1/2016 |

(Continued)

*Primary Examiner* — Luan K Bui
(74) *Attorney, Agent, or Firm* — Leason Ellis LLP

(57) ABSTRACT

A protective case for a pearl comprises a wall defining a closed internal volume for containing a pearl when the case is closed. A first case part and a second case part each form a substantial wall portion of the wall of the case. The first and second case parts are adapted to be releasably closed together to define the closed internal volume of the case, and each of the first and second case parts is formed from a transparent material. An irreversible locking mechanism is adapted to lock the first and second parts together when closed and prevent the first and second parts from being opened, such that the locking mechanism must be broken to open the case. The locking mechanism is located inside the case and is visible through the transparent material of at least one of the first and second case parts so that a state of the locking mechanism is discernible from an outside of the case.

18 Claims, 12 Drawing Sheets

(56) References Cited

U.S. PATENT DOCUMENTS

| | | | |
|---|---|---|---|
| 2007/0138180 A1* | 6/2007 | Vovan | B65D 43/0235 |
| | | | 220/266 |
| 2009/0032417 A1* | 2/2009 | Liu | G11B 33/045 |
| | | | 206/308.2 |
| 2009/0107856 A1* | 4/2009 | Egnatic | B08B 3/047 |
| | | | 206/6.1 |
| 2010/0213087 A1* | 8/2010 | Weldon | A63B 47/00 |
| | | | 206/315.9 |
| 2012/0067746 A1 | 3/2012 | Gremaud et al. | |
| 2015/0307250 A1 | 10/2015 | Sokol | |
| 2018/0334294 A1 | 11/2018 | Pinheiro | |

FOREIGN PATENT DOCUMENTS

| | | |
|---|---|---|
| CN | 110 269 020 | 9/2019 |
| GB | 2566578 | 3/2019 |
| WO | WO 2014/184341 | 11/2014 |

* cited by examiner

CASE AND A METHOD FOR PROTECTING A PEARL, AND AN APPARATUS FOR ENCASING A PEARL

CROSS-REFERENCE TO RELATED PATENT APPLICATIONS

This application claims priority to New Zealand patent application no. 754581, filed on Jun. 14, 2019, the contents of which is hereby incorporated herein by reference in its entirety.

FIELD OF INVENTION

The invention generally relates to a case for protecting a pearl and a method for protecting a pearl. The invention also relates to an apparatus for encasing a pearl.

BACKGROUND TO THE INVENTION

Pearls have been highly valued for centuries as rare objects of beauty. The saltwater oyster pearl is the best-known and most commercially significant pearl. The oyster pearl is made by layers of nacre, the same material used in the secretion of the mother of pearl which forms the oyster shell. The oyster pearl is highly desirable and valued for its high luster and iridescence, caused by the overlapping layers of nacre which breaks up light as it falls on and is reflected by the surface of the pearl.

Pearls are formed by a natural process when an irritant becomes trapped within the oyster, mussel or clam. The mullusk works to coat the irritant with the same material that forms the shell. Layer upon layer is applied until the pearl is formed.

Pearls are either natural or cultured. Natural (or wild) pearls are formed around a naturally occurring irritant (normally a parasite) and therefore are formed without human intervention. Natural pearls are very rare. Many hundreds of pearl oysters or mussels must be gathered and opened, and thus killed, to find even one wild pearl. For many centuries, this was the only way pearls were obtained, and why pearls historically fetched such extraordinary prices.

Cultured pearls are formed by human intervention by manually placing an irritant (seed or nucleus) inside the oyster by a skilled technician. Oysters are hung in racks within the sea (a pearl farm) and left to develop with the pearl being formed within the oyster by the same natural process as for a natural pearl, with layer upon layer of nacre being applied to the seeded irritant.

Cultured pearls are thus indistinguishable from natural pearls other than by x-ray to determine if a nucleus exists inside the pearl.

Pearls are sold individually as collectors' items, set in jewellery, or sold in strands. The value of a pear is determined much like the value of other precious gemstones, with value being dependent on size, shape (e.g. roundness), colour, surface quality and luster.

Although less rare than naturally occurring pearls, cultured pearls are still highly valued since the pearl forming process cannot be mass produced. An oyster must reach a mature age before it can be operated on to accept a nucleus. Oysters are grown in farms from spat and can take 3 years to reach maturity. Oysters can only be nucleated with one pearl at a time, and the natural process of forming layers of nacre around the nucleus takes many years. Even then, only a portion of the pearls formed are of gemstone quality. The farming process is also highly laborious and therefore costly, with oysters requiring cleaning to remove growth from shell and oyster health requiring monitoring. The seeding process is shrouded in secrecy, with pearl companies and even individual technicians keeping their preferred and most successful seeding operations secret. Thus, high quality cultured pearls suitable for use by top jewellery makers or as individual collection pieces are also very rare and therefore highly desirable and expensive.

Unlike other gemstones such as diamonds, pearl lustre and surface quality can diminish slowly over time through use and can be damaged by contact with chemicals or abrasive surfaces. A diamond is 2 to 4 times harder than a pearl. Nacre is nearly 100% calcium carbonate and conchiolin. Conchiolin is an organic material that holds the calcium carbonate together. Calcium carbonate dissolves in acidic solutions, and even weak acid solutions can damage the surface of a pearl. Some plastics can emit chemicals that cause the surface of a pearls to deteriorate. Pearls should not be stored in a safe deposit box for long periods, since the dry atmospheric conditions in which safe deposit boxes are kept can dry out pearls, causing them to develop small surface fractures. Advice provided to owners of pearls is that pearls 'should be the last thing you put on when dressing and the first thing you take off when you get home'.

It would be desirable to provide a method for protecting a pearl and/or a protective case for protecting pearls against deteriorating through use or contact with chemicals or other surfaces. It would also be desirable to provide a method or protective case that preserves a pearl yet allows a pearl to be viewed and/or enjoyed by a person. Furthermore, it would be desirable to provide a method or protective case that preserves a pearl so that the authenticity and original state (and therefore value and quality) can be maintained and ascertained.

OBJECT OF THE INVENTION

It is an object of the invention to address one or more of the above-mentioned disadvantages, or to at least provide the public with a useful choice.

SUMMARY OF THE INVENTION

According to a first aspect of the invention, there is provided a protective case for a pearl, the case comprising:
  a wall defining a closed internal volume for containing a pearl when the case is closed,
  a first case part and a second case part, the first and second case parts each forming a substantial wall portion of the wall of the case, the first and second case parts adapted to be releasably closed together to define the closed internal volume, and each of the first and second case parts formed from a transparent material;
  an irreversible locking mechanism adapted to lock the first and second parts together when closed and prevent the first and second parts from being opened, such that the locking mechanism must be broken to open the case; and
  wherein the locking mechanism is located inside the case and is visible through the transparent material of at least one of the first and second case parts so that a state of the locking mechanism is discernible from an outside of the case, the state of the locking mechanism being either unbroken or broken.

In some embodiments, the case comprises a coupling mechanism adapted to releasably close the first and second case parts together to define the closed internal volume.

In some embodiments, the first and second parts are adapted to be releasably coupled together to close the case and are separated to open the case.

In some embodiments, the coupling mechanism comprises a threaded engagement and the locking mechanism is broken as the first and second parts are unthreaded to open the case.

In some embodiments, an external surface of the case is substantially spherical.

In some embodiments, an external surface of each of the first and second parts is substantially hemispherical.

In some embodiments, an internal surface of the case is substantially spherical.

In some embodiments, the locking mechanism comprises at least one tooth and at least one lever, when closing the case the lever riding over the tooth without damaging the locking mechanism, and wherein opening the case breaks the at least one tooth and/or the at least one lever.

In some embodiments, one of the first and second parts comprises the at least one tooth and the other one of the first and second parts comprises the at least one lever.

In some embodiments, the at least one tooth is integrally formed with one of the first and second parts.

In some embodiments, the at least one lever is integrally formed with the other one of the first and second parts.

In some embodiments, the locking mechanism comprises a plurality of teeth.

In some embodiments, the locking mechanism comprises a plurality of levers.

In some embodiments, the locking mechanism comprises a ratchet, wherein opening the case breaks a tooth and/or a lever or pawl of the ratchet.

In some embodiments, one of the first and second case parts comprises a ratchet gear and the other one of the first and second parts comprises a ratchet pawl or lever to engage teeth of the gear.

In some embodiments, the case comprises a unique identifier.

In some embodiments, the case comprises a seal to limit or prevent contaminants reaching an inside of the case.

In some embodiments, the seal is a pressure or airtight seal, to maintain a controlled atmosphere inside the case.

In some embodiments, the case is adapted to contain a single pearl only.

According to a second aspect of the invention, there is provided a pearl and a case. The pearl is closed with the pearl inside the case. The case is as described in any one or more of the above statements. In some embodiments, the pearl is encased in an inert atmosphere inside the case. In some embodiments, the inert atmosphere has a positive pressure.

A method for storing and protecting a pearl is described. The method comprises the steps of:
placing a pearl and an open case in an encasing chamber comprising an inert gas and/or purging the chamber with an inert gas,
placing the pearl in the open case inside the chamber,
closing the case inside the chamber, so that closed case contains the inert atmosphere and the pearl, wherein the case is adapted to seal the inert atmosphere inside the case, and
removing the closed case with pearl encased by the case from the chamber.

In some embodiments, the step of placing the pearl and the open case in the encasing chamber comprises the steps of:
placing the pearl and the open case in a front transitioning chamber, purging the front transitioning chamber with the inert gas,
fluidly connecting the front transitioning chamber and the encasing chamber,
transferring the pearl and the open case from the front transitioning chamber to the encasing chamber, and
fluidly disconnecting the transitioning chamber from the encasing chamber.

In some embodiments, the step of removing the case from the packing chamber comprises:
purging a back transitioning chamber,
fluidly connecting the back transitioning chamber and the packing chamber,
transferring the closed case with pearl encased by the case from the installation chamber to the back transitioning chamber,
fluidly disconnecting the installation chamber from the back transitioning chamber, and
removing the closed case with pearl encased by the case from the back transitioning chamber.

The method is preferably used to encase a pearl in a case as described in any one or more of the above statements in relation to the first aspect of the invention.

A method for authenticating a pearl comprises encasing a pearl in a case as described in any one or more of the above statements in relation to the first aspect of the invention, and wherein the case is provided with a unique identifier. Preferably the method including maintaining a register of pearl specifications for a plurality of pearls, and wherein the register includes a said unique identifier for each pearl. Each unique identifier may be a serial number.

An apparatus for encasing a pearl in an inert atmosphere within a case is described. The case comprises a first case part and a second case part, wherein the first and second case parts each form a substantial wall portion of a wall of the case to define a closed internal volume for containing a pearl when the first and second parts are closed together to close the case, wherein the apparatus comprises:
an encasing chamber;
an inert gas supply to the chamber to purge the encasing chamber of air by an inert gas provided by the gas supply;
a tray for holding and/or positioning the first and second case parts; and
a manipulator to handle the first case part, the manipulator adapted to move the first case part to the second case part to close the two parts together to close the case.

In some embodiments, the manipulator comprises a frame, a pickup carried by the frame to capture the first case part, and an actuator to move the frame to move the pickup between the first case part and the second case part.

In some embodiments, the tray comprises a recess for receiving the second case part within the recess with an inside of the second case part arranged upwardly to receive the pearl to an inside of the second case part.

In some embodiments, the tray comprises a projection on which the first case part is positioned with an inside of the first case part arranged downwardly.

In some embodiments, the apparatus comprises a pneumatic pressure supply to apply a negative pressure to the recess to secure the second case part in the recess.

In some embodiments, the apparatus comprises a nozzle movable to engage a port of the tray to connect the pneumatic pressure supply to the recess via a conduit between the port and the recess.

In some embodiments, the frame comprises a first frame and a second frame carried by the first frame, where the actuator moves the first frame in a first direction and a second actuator moves the second frame in a second direction orthogonal to the first direction.

In some embodiments, the first direction is horizontal and the second direction is vertical.

In some embodiments, the pickup comprises a suction cup to secure to the case first part by applying a negative pneumatic pressure to the cup to suck the case first part to the pickup.

In some embodiments, the case comprises a threaded engagement between the first and second case parts, and wherein the first and second case parts are threaded together to close the case, and wherein the apparatus comprises a rotary mechanism to rotate and extend the pickup to thread the first part to the second part to close the case.

In some embodiments, the apparatus comprises a device to move the tray to enter the encasing chamber via an inlet hatchway and exit the encasing chamber via an exit hatchway.

In some embodiments, the tray moved in a horizontal direction.

In some embodiments, the frame is adapted to move in a horizontal direction orthogonal to the horizontal direction of the tray.

In some embodiments, the apparatus comprises a front transitioning chamber, an inlet hatchway, an actuator to open and close the inlet hatchway, the front transitioning chamber fluidly connected to the encasing chamber when the inlet hatchway is open and fluidly separated from the encasing chamber when the inlet hatchway is closed, the inert gas supply connected to the front transitioning chamber to purge the front transitioning chamber of air by an inert gas when the inlet hatchway is closed, and a device to move the tray from the front transitioning chamber to the encasing chamber when the inlet hatchway is open.

In some embodiments, the apparatus comprises a back transitioning chamber, an exit hatchway, an actuator to open and close the exit hatchway, the back transitioning chamber fluidly connected to the encasing chamber when the exit hatchway is open and fluidly separated from the encasing chamber when the exit hatchway is closed, the inert gas supply connected to the back transitioning chamber to purge the back transitioning chamber of air by an inert gas when the exit hatchway is closed, and a device to move the tray from the encasing chamber to the back transitioning chamber when the exit hatchway is open.

In some embodiments, the volume of the transitioning chamber is substantially less than the volume of the encasing chamber.

In some embodiments, the apparatus is adapted to process a plurality of pearls simultaneously, the tray holding and/or positioning a plurality of cases and pearls.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the invention will be described below by way of example only, and without intending to be limiting, with reference to the following drawings, in which.

DESCRIPTION OF PREFERRED
EMBODIMENTS OF THE INVENTION

Figure 1:
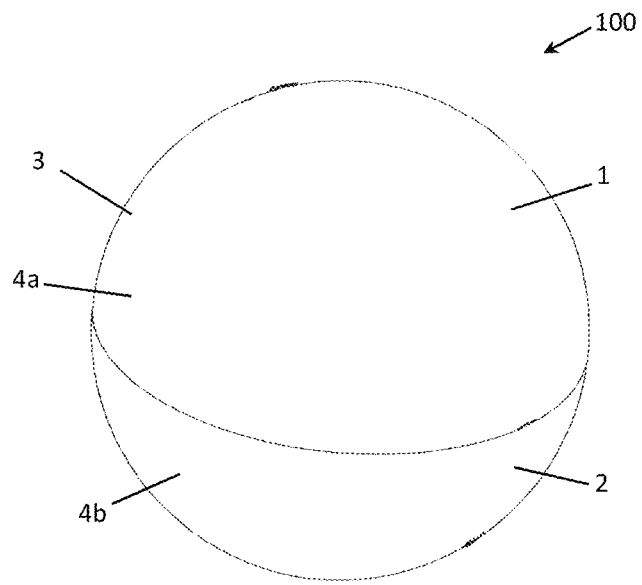
FIG. 1 illustrates a case for a pearl according to one preferred embodiment of the present invention.
Figure 2:
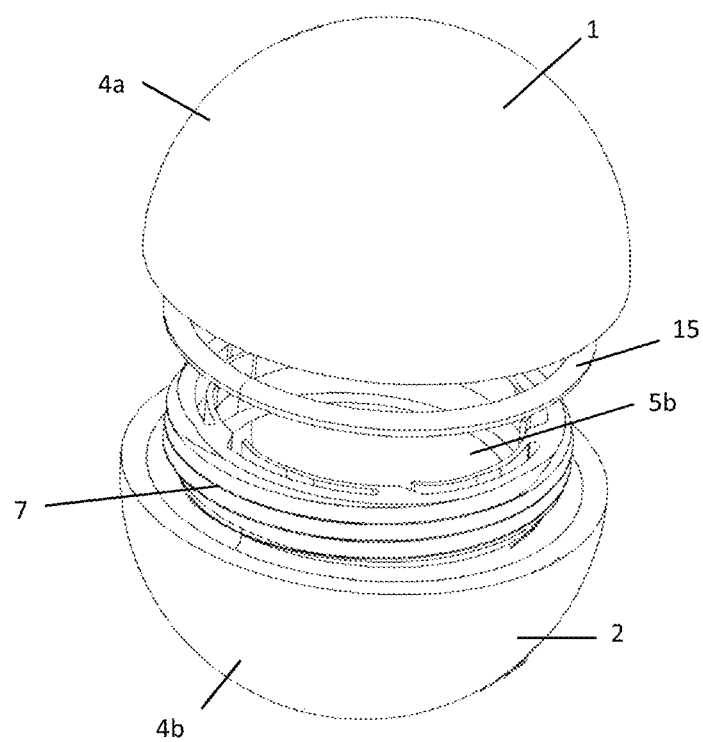
FIG. 2 illustrates the case of FIG. 1 with parts of the case separated.
Figure 3:
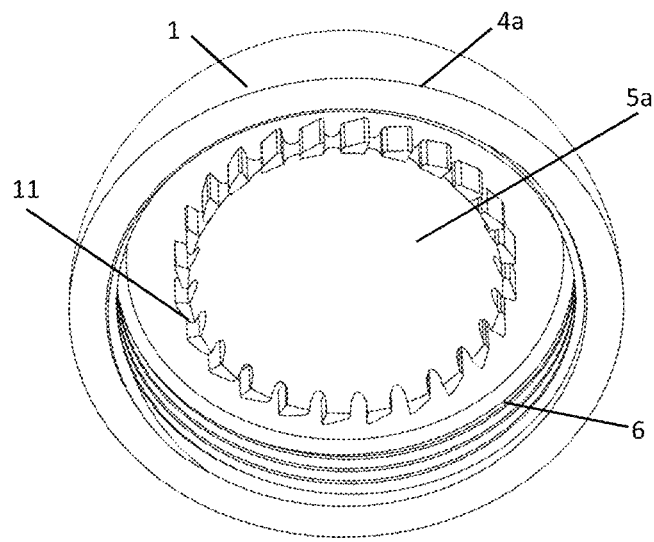
FIG. 3 illustrates a first part of the case that provides or forms a substantial portion of a wall of the case.

A case for protecting a pearl according to an embodiment of the present invention is described with reference to FIGS. 1 to 8. The case 100 comprises a wall 3 to define an internal closed volume for holding or containing a pearl. The case 100 comprises a first case part 1 or side of the case and a second case part 2 or side of the case. The first and second case parts 1, 2 each define a substantial portion of the wall 3 of the case 100. In the illustrated embodiment, together the first and second parts 1, 2 form the entire wall 3 of the case. The first and second parts 1, 2 are adapted to be releasably closed together to define the closed internal volume for containing a pearl. The parts 1, 2 when closed together form, or substantially form, the closed wall 3 of the case 100. In the illustrated embodiment, the first and second parts 1, 2 are adapted to be releasably coupled together. FIG. 1 shows the first and second parts coupled together to form the closed case to protect a pearl contained within the closed volume inside the case. FIG. 2 shows the first 1 and second 2 parts separated to provide access to the interior of the case or the interior of each of the first and second parts/wall portions of the case.

In preferred embodiments, when closed, the case has an outer surface 4, that is substantially spherical, as shown in FIG. 1. An inner surface 5 of the closed case 100 is also preferably substantially spherical. In the illustrated embodiment the outer surface 4 and the inner surface 5 share the same centre of curvature, such that wall 3 of the case has a constant wall thickness between the inner and outer surfaces.

A spherical case is particularly suited for round pearls, a round or spherical shaped pearl being the most desirable and highly valued. However, other shapes may be envisaged without departing from the scope of the invention. For example, the case 100 may be shaped to match differently shaped pearls, such as tear drop shaped, or may be shaped other than a shape of a pearl to be contained by the case. Preferably the case is shaped to correspond with a particular shaped pearl, e.g. round (spherical) or tear drop.

In the illustrated embodiment, each of the first and second parts 1, 2, are substantially hemispherical in shape. The outer surface 4*a*, 4*b* of each of the first and second parts is substantially hemispherical. Each of the first and second parts 1, 2 comprises a substantially hemispherical inner surface 5*a*, 5*b*. The substantially hemispherical inner surfaces of the first and second parts combine to form a closed substantially spherical surface 5 when the two parts 1, 2 are engaged together to preferably house a round pearl.

The first and second parts have an engagement feature or coupling mechanism to releasably close or couple the two parts together. In the illustrated embodiment, the coupling mechanism comprises a threaded engagement between the two parts. One of the first and second parts has a male thread 7 and the other one of the first and second parts has a matching female thread 6, so that the two parts 1, 2 may be threaded together to releasably couple the two parts 1, 2 together. To open the case the parts are unthreaded from one another by relative rotation between the case parts. The male and female threads are formed radially outward of the inner hemispherical surfaces 5*a*, 5*b*. Other alternative engagement features or coupling mechanisms may be possible, for example a hinging arrangement between the two parts. Preferably, and as in the illustrated embodiment, the coupling mechanism is inside the case, i.e. inside of the outer surface of the case.

The case 100 is preferably substantially formed from a transparent material. Preferably each of the first and second parts 1, 2 are substantially formed from a transparent material, such that the pearl within the case is substantially visible through the first and second parts of the case. Substantially all of the pearl may be visible through the case. One preferred transparent material is PMMA (Poly methyl methacrylate), also known as acrylic, acrylic glass, plexiglass and by the trade names Crylux™, Plexiglas™, Acrylite™, Lucite™ and Perspex™. PMMA has a high transparency (99%) and has other important attributes such as resistance to scratching, is lightweight and is a thermoplastic so that it is suitable for injection moulding. Other materials are possible, such as glass or other glasslike engineering plastics. Preferably the material has a minimum transparency of 90%.

According to the present invention, the case comprises a locking or anti-tamper mechanism 10 (herein locking mechanism). The locking mechanism 10 is uni-directional so that the locking mechanism allows the first and second parts 1, 2 to be coupled together to close the case without the locking mechanism working to prevent relative movement of the parts during closure of the case. However, the uni-directional locking mechanism prevents the first and second parts 1, 2, from being opened. The locking mechanism functions to prevent the case from being opened unless the locking mechanism is broken or destroyed. The locking mechanism is therefore an irreversible locking mechanism. The locking mechanism is broken or destroyed by opening the case. For example, in the illustrated embodiment, the locking mechanism is broken as one case part is unthreaded from the other.

Preferably the first and second parts each comprise a mechanical projection, the mechanical projection of the first part engaging the mechanical projection of the second part to provide the unidirectional locking mechanism. With reference to the illustrated embodiment, and in particular FIGS. 5 to 8, one of the first and second parts 1, 2, comprises at least one tooth 11, and the other one of the first and second parts comprises a lever 12 to engage the tooth 11. The tooth 11 comprises a ramp or cam surface 11*a* so that when closing the two parts 1, 2 together, the lever 12 rides over the ramp or cam surface 11*a* to allow the two parts 1, 2 to be closed without damaging the tooth 11 or the lever 12. The tooth comprises a shoulder 11*b*. The lever 12 also presents a shoulder 12*b*. The lever shoulder 12*b* acts against the tooth shoulder 11*b* to prevent opening of the case. To open the case, a force must be applied to the case to force the shoulders 11*b*, 12*b* together until the lever 12 and/or the tooth 11 breaks/snaps to allow the case 100 to be opened.

With reference to the illustrated embodiment, one of the first and second parts 1, 2 preferably comprises a plurality of teeth 11 and the other one of the first and second parts 1, 2 comprises at least one lever 12 to engage the teeth 11 as described above. In such an embodiment, the unidirectional locking mechanism is a ratchet, with one of the first and second parts comprising the gear 13 of the ratchet and the other one of the first and second parts comprising the pawl 11 or lever 11 of the ratchet. Preferably the teeth 11 are equi-spaced apart. In the illustrated embodiment the teeth 11 are equi-spaced apart in a circumferential direction. Preferably the tooth or teeth is/are integrally formed with the first and/or second part.

The illustrated embodiment comprises a plurality of levers or pawls 12. The levers 12 move to ride over the teeth 11 by elastic deflection as the case is closed, however the lever may be rotationally coupled to the first or second part and biased by a spring to engage the tooth of the other one of the first and second parts. This illustrated embodiment has six levers 12, however there may be one or more levers 12, and may comprises more than six levers 12. The levers are preferably equi-spaced apart. In the illustrated example the lever(s) is/are equi-spaced apart in a circumferential direction. Preferably the lever is integrally formed with the first and/or second part.

Figure 4:
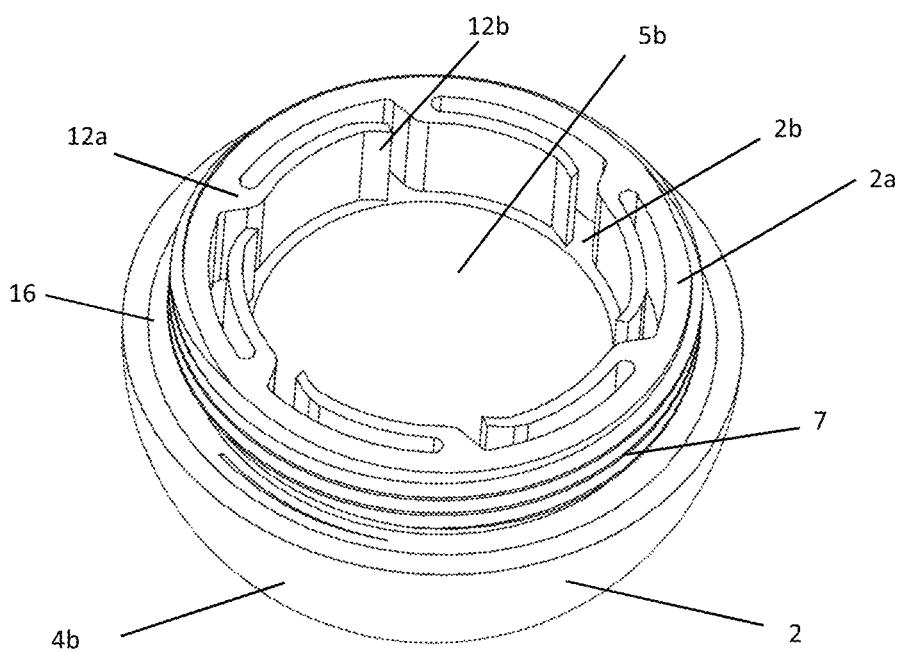
FIG. 4 illustrates a seal and a second part of the case that provides or forms a substantial portion of a wall of the case. The first and second parts together form a closed wall of the case when the first and second parts are closed together.
Figure 5:
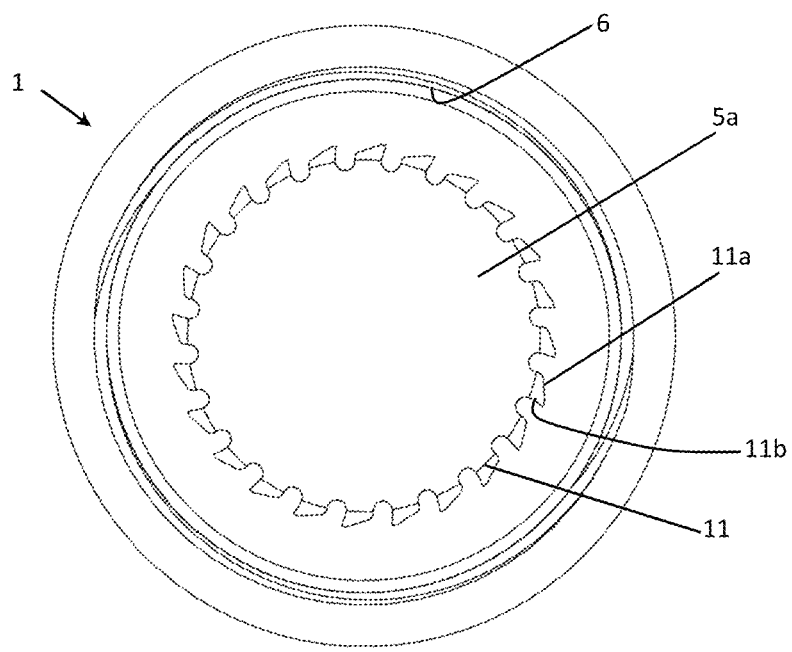
FIG. 5 illustrates an end view of the case first part to show the inside of the first part of the case.
Figure 6:
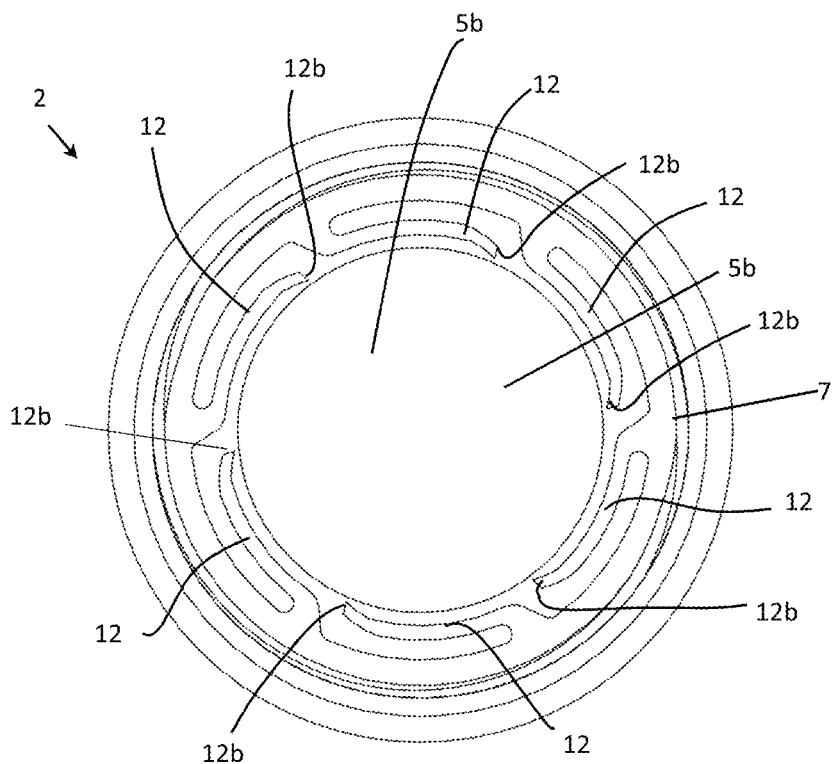
FIG. 6 illustrates an end view of the case second part to show the inside of the second part of the case.
Figure 7:
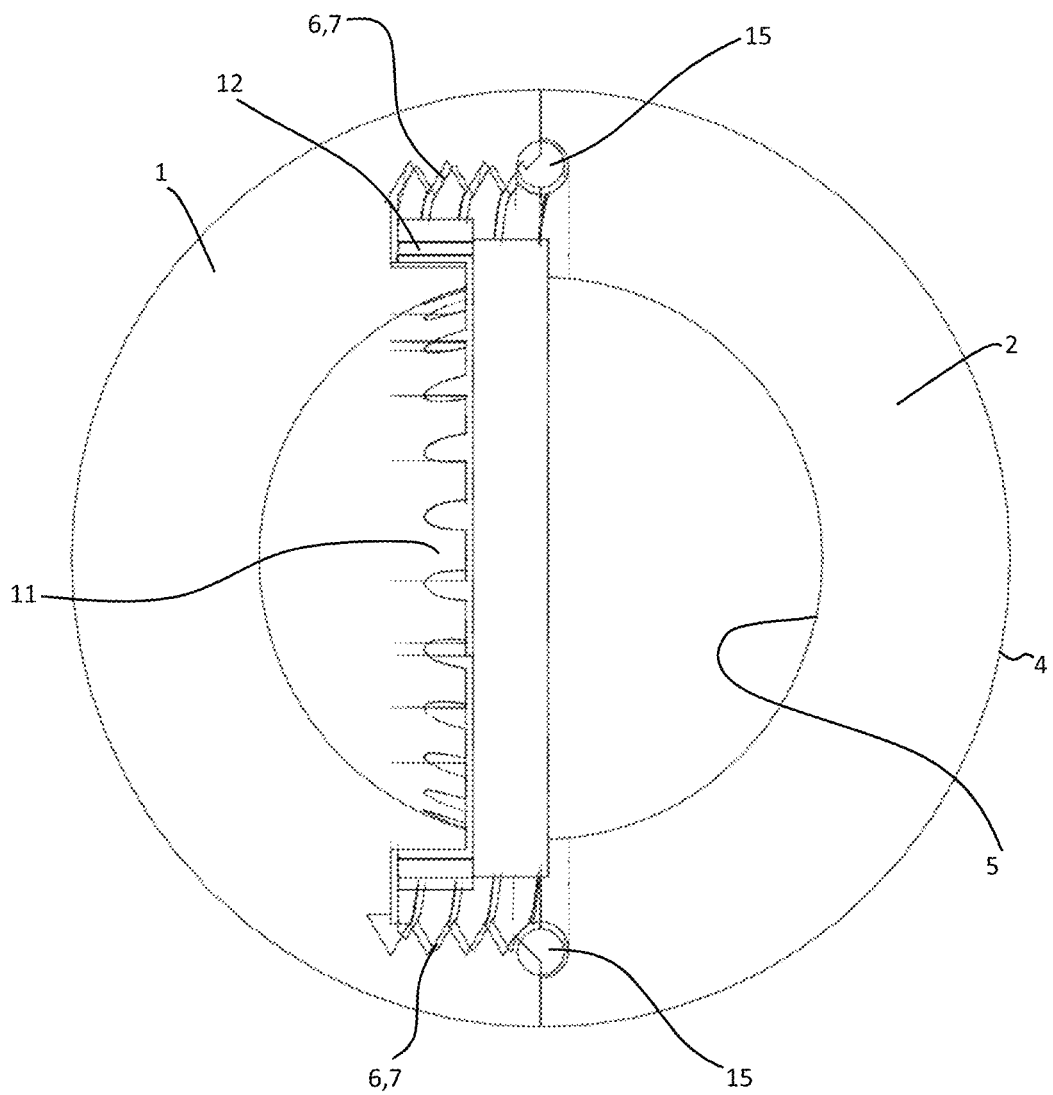
FIG. 7 is a cross section of the closed case, the section being on a centreline of the case.
Figure 8:
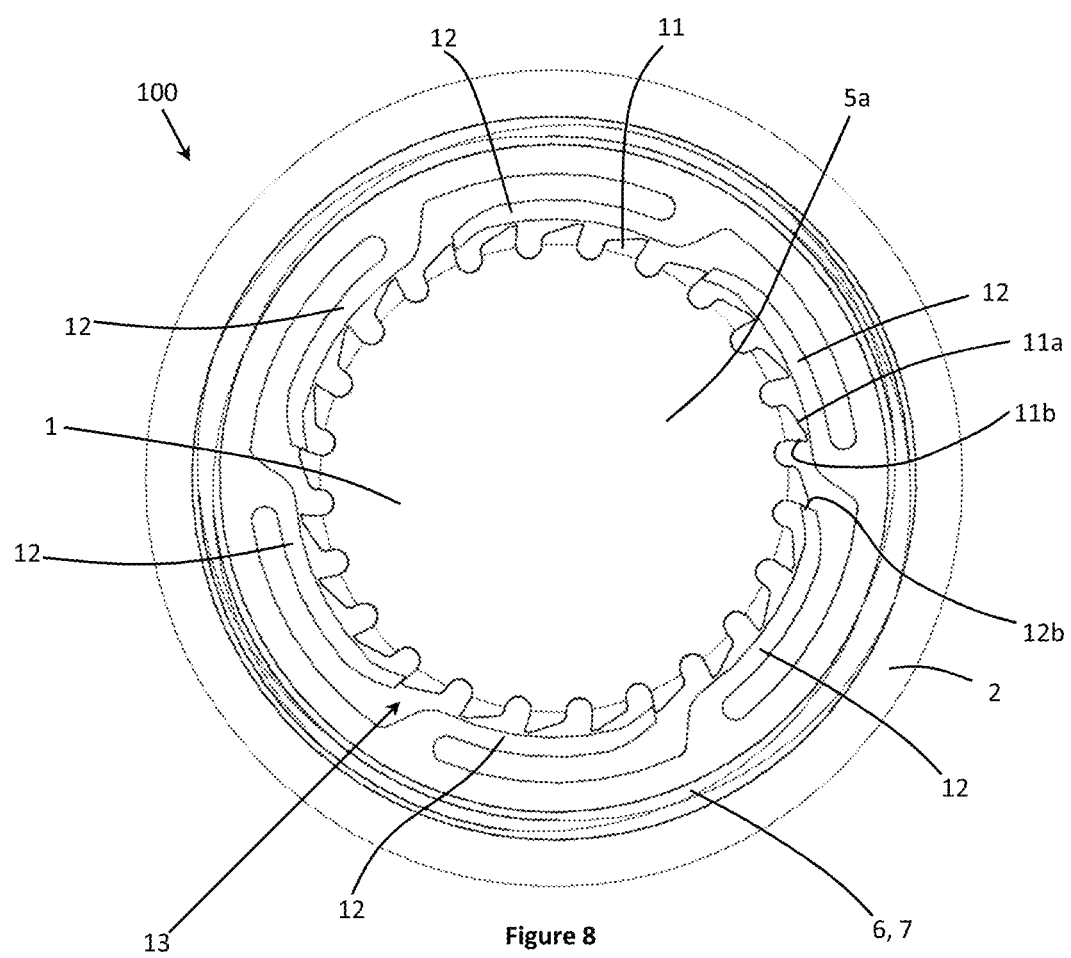
FIG. 8 is a cross section through a uni-directional locking mechanism of the case.
Figure 9:
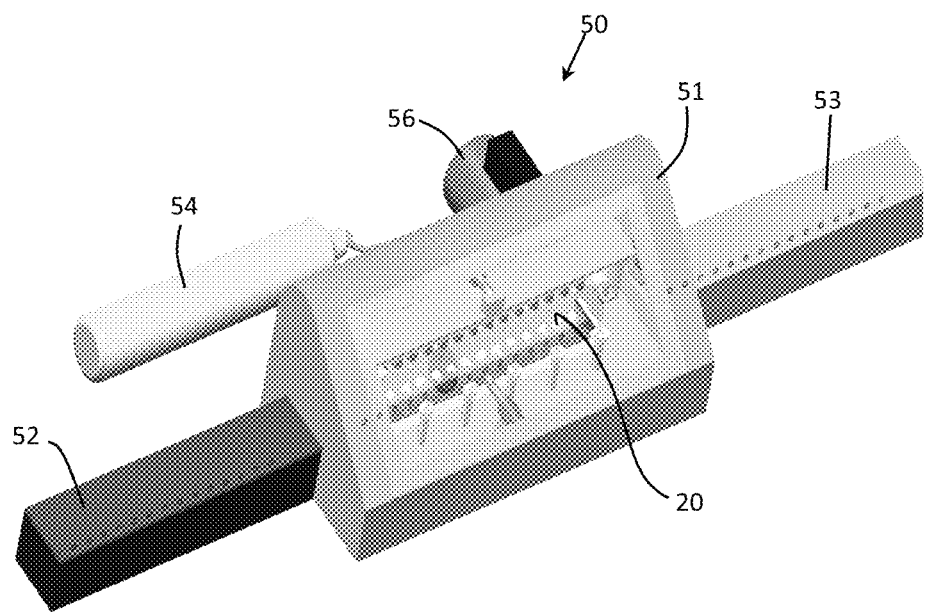
FIGS. 9 and 10 illustrate an apparatus for encasing a pearl in an inert environment inside a case, the apparatus comprising an encasing chamber.
Figure 10:
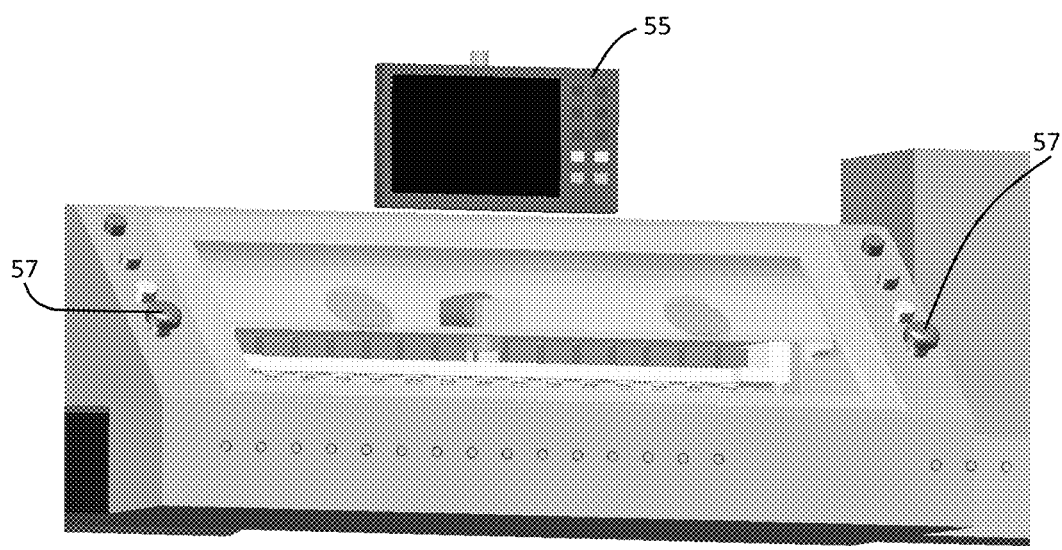

In the illustrated embodiment, and with reference to FIGS. 4 and 6 the lever 12 is attached to the case part 2 at one end 12a of the lever, opposite to a free end 12b of the lever. The end of the lever is attached to a cylindrical wall 2a of the case part. The lever may be cantilevered from the end opposite to the free end. At least a portion of the free end 12b of the lever deflects, for example radially outwards, as it rides over the teeth on the other case part during closure of the case. The free end 12b of the lever abuts a tooth 11 to prevent opening the case without breaking the lever 12 and/or tooth 11. Additionally, in the illustrated embodiment the lever 12 is attached along its length to a lateral surface (2b in FIG. 4) of the case part 2. The lateral surface is parallel to a diametric plane of the case. In some embodiments, the lever may be attached to or cantilevered from the case part 2 at one end only, or may be attached along its length to a lateral surface without attachment to a cylindrical surface of the case part.

The number of teeth 11 and/or pawls/levers 12 may be provided to achieve a desired force to break the locking mechanism to allow the case to be opened. The locking mechanism may be designed so that the case cannot be opened without the use of tools, such as pliers or other gripping or clamping tools to apply torque to the case.

Other unidirectional locking mechanisms are possible. For example, the case may comprise a uni-directional clasp comprising a tongue to be received in a recess, with a shoulder of the tongue engaging a shoulder of the recess to prevent opening of the case without breaking the tongue or recess. The tongue may elastically deflect to be received within the recess. A clasp may comprise a plurality of tongues and corresponding recesses. In such embodiments the two parts 1, 2 may be hinged together or may be pressed together, to close the two parts together to close the case. To open the case the case parts must be prised apart to separate the case parts and break the tongue and/or recess shoulder projection.

The locking mechanism 11, 12 is provided inside the case, i.e. inside of the outer surface of the case. In the illustrated embodiment, the locking mechanism is provided in between the inner surface and the outer surface of the case. In the illustrated embodiment, the locking mechanism is provided radially outwards of the inner surface. In the illustrated embodiment, the locking mechanism is provided radially inwards of the coupling mechanism 6, 7.

Since the locking mechanism is provided inside the case, the locking mechanism cannot be tampered with or defeated. The locking mechanism is not accessible from an outside of the closed case. For example, there is no keyway. The locking mechanism cannot be moved from the locked position to an unlocked position without breaking the locking mechanism and/or the case, i.e. the wall of the case. The case can only be opened by breaking the locking mechanism, or by cutting though the wall of the case with a cutting tool. The locking mechanism is therefore irreversible.

As described above, the first and second parts 1, 2 of the case 100 are transparent. The locking mechanism located within the case is visible through the transparent material of at least one of the first and second parts 1, 2 of the case from an outside of the case. By viewing the locking mechanism 11, 12 through the transparent material of the case, the state of the locking mechanism 11, 12 can be determined, the state being either intact/unbroken, or breached/broken. An intact locking mechanism proves the case has not been opened after a pearl has been closed in the case. A broken locking mechanism visible from an outside of the closed case proves the case has been opened and reclosed at least once after a pearl has been closed in the case. The state of the locking mechanism within the closed case can therefore be used to confirm the authenticity of a pearl protected by the case.

In preferred embodiments, the case includes a seal to limit or prevent contaminants reaching an inside of the case. The illustrated embodiment comprises a seal 15. The seal is a pressure or airtight seal, to maintain a controlled atmosphere inside the case. The seal may be an o-ring or other sealing member or gasket. In the illustrated embodiment the seal is an o-ring type seal and is received in a o-ring groove 16 in the second part 2. However, the seal may be received in a groove or otherwise on the first part 1. The seal 15 may comprise an elastomeric material. In one preferred embodiment the seal is transparent, for example a transparent elastomeric material such as a transparent silicone rubber. In some embodiments, the seal groove may be coated with a previous metal, such as gold, so that the seal is not visible from an outside of the transparent case. In some embodiments, the seal may comprise a precious metal, and/or may comprise a previous metal coating. For example, the seal may comprise gold or may be gold plated. The seal may be a face/axial seal or barrel/circumferential seal. There may be more than one seal member to increase the integrity of the seal between the inside of the case and the surrounding atmosphere. The seal may be a gasket sandwiched between the first and second parts when the case is closed, with an outer edge surface of the gasket forming a portion of the outer surface of the case, i.e. the outer spherical surface of the case.

In preferred embodiments the seal is adapted to maintain an inert atmosphere inside the case. Preferably the seal is adapted to maintain a positive pressure (a pressure higher than ambient pressure) inside the case. During a pearl casing operation, a pearl is placed inside one of the two parts within a controlled atmosphere. The two parts are then couple together so that the controlled atmospheric conditions are captured inside the closed case. The seal maintains the controlled atmospheric conditions within the case after the case has been removed from the controlled atmosphere.

The controlled atmospheric conditions may comprise an inert gas. For example, the controlled atmospheric conditions may comprise an inert gas with an oxygen content of less than 1%, or less than 0.5%, or less than 0.1% by volume. The inert gas may be Nitrogen or other suitable gas. The controlled atmospheric conditions may have a positive pressure, for example a pressure of about 100 to 200 kPA above atmospheric pressure.

In preferred embodiments, the case includes a unique identifier, such as a unique serial number, so that specifications of the pearl including size, shape (e.g. roundness), colour, surface quality, luster and any other attributes such as source may be recorded in a register and matched with the pearl contained within the case. The unique identifier may be stamped, etched or applied by a laser to the case, or by other suitable means. The identifier may be provided to an inside surface of the case and visible from the outside of the case through the transparent material of the first and/or second parts of the case. The identifier may be provided to the outside surface of the case.

Each case is preferably suited to hold a single pearl only. A range of cases may be provided, for each case in the range of cases suitable for a pearl size range. For example, one case may be suitable for pearls in a diameter range. A maximum gap between the inner surface 5 and the outer surface may be specified, for example a maximum radial gap of 1 mm to 2 mm.

Preferably the case dimensions and case material are suitable to withstand impacts. For example to not break when dropped onto a hard surface. Where the case is made of PMMA or other similar material, the wall of the case may have a thickness of around 2-4 mm.

Figure 1A:
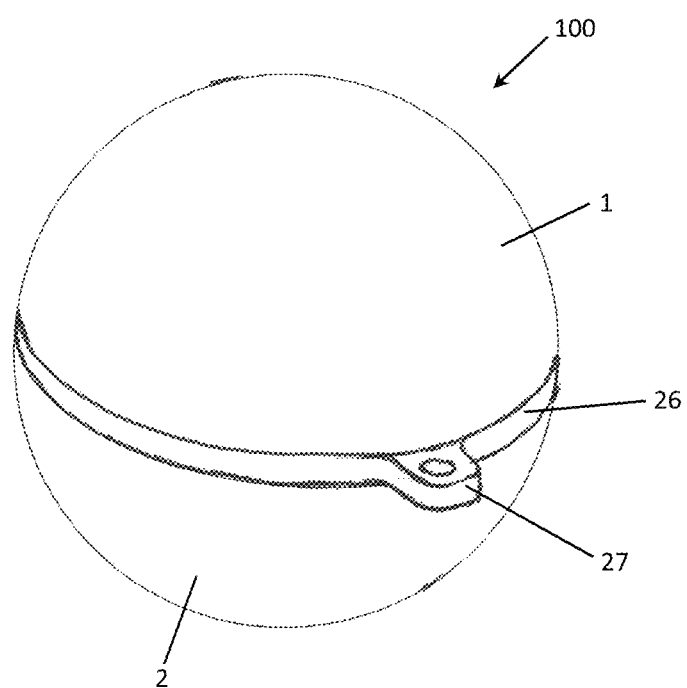
FIG. 1a illustrates a case for a pearl comprising an attachment for attaching the case to a jewellery item.

In some embodiments, the case may be adapted to allow the case with encased pearl to be worn as a piece of jewellery. For example the case may comprise a closed/blind hole in the outer surface of the case to receive an attachment to attach the case to another jewellery item such as a necklace. The case may comprise an attachment mechanism to attach the case to another jewellery item, such as a necklace. As shown in FIG. 1A, the attachment mechanism 25 may comprise a flange 26 sandwiched between the first and second parts 1, 2 when the case is closed, with a portion/tab 27 of the attachment mechanism extending outwards from the flange and the external surface of the case. An outer edge surface of the flange may form part of the outer surface of the case, such as an outer spherical surface of the case. The tab may be provided with a hole for attachment to another jewellery item.

A case according to the present invention protects a pearl from deterioration caused through wearing or handling the pearl by contact with other objections or chemicals, and additionally provides a mechanism whereby the authenticity and original state of a pearl is ascertainable. Once a case has been opened, the state of the pearl is no longer controlled. The pearl would need to be revalued and cased in a new case with a new unique identifier. A pearl may be sold encased in a case according to the present invention.

An outer case or box may be provided. For example, an outer spherical box, the outer spherical box may be formed from wood or other attractive material. The outer box may have the same shape as the case 100. For example, the outer box may be spherical, with a spherical outer surface and a spherical inner surface, with the inner and outer surfaces having the same centre of curvature, to suit a spherical case 100. The box may comprise two halves, e.g. two hemispherical halves. The box may comprise a window with magnifying glass so that the pearl encased within case 100 can be viewed through the magnifying glass window. The two halves of the box may have a coupling mechanism to allow the two halves to be moved between open and closed positions, for example the coupling mechanism may be a hinge. The box may have a mechanism to hold the halves of the box in a closed configuration, such as a latch or clasp or may comprise a magnetic material in one half and a magnet in the other to hold the two halves together via a magnetic force.

An apparatus and a method for encasing a pearl is described with reference to FIGS. 9 to 25. The apparatus comprises an encasing chamber 51. A human machine interface 55, 57 for operating the apparatus is provided.

A pearl 20 and an open case 100 (refer FIG. 16) is placed inside the encasing chamber 51. The chamber provides an inert atmosphere in which the pearl is encased within the chamber. The chamber is provided with an inert gas supply 54 so that the chamber 51 can be purged of air by an inert gas provided by the gas supply. Once the open case and pearl are located in the inert atmosphere within the chamber, the case is closed with the pearl located inside. Closing the case inside the chamber captures the inert atmosphere within the closed case so that the pearl is encased in the inert atmosphere within the case 100. The case seals the atmosphere within the case 100. Once the case has been sealed closed, the closed case with pearl is removed from the chamber.

Figure 11:
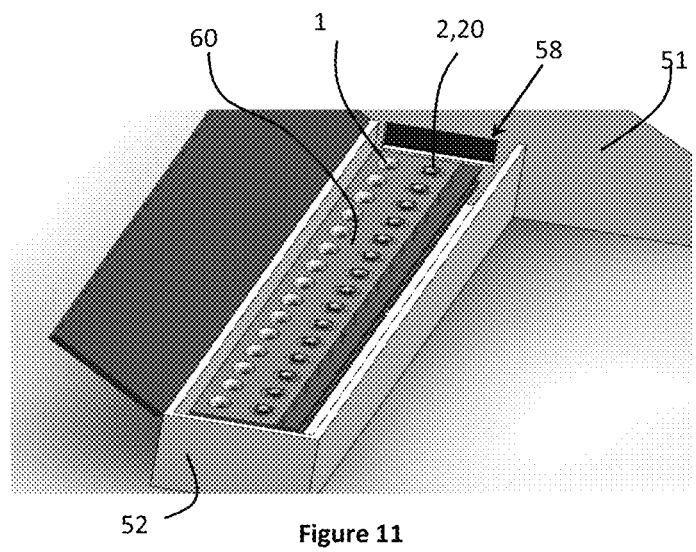
FIG. 11 illustrates a tray of the apparatus of FIGS. 9 and 10 for holding an open case and pearl positioned within an open front transitioning chamber of the apparatus.
Figure 12:
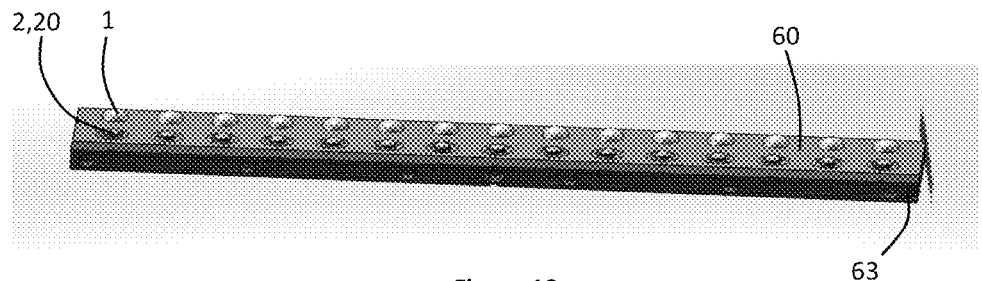
FIG. 12 illustrates the tray of the apparatus of FIGS. 9 and 10.
Figure 13:
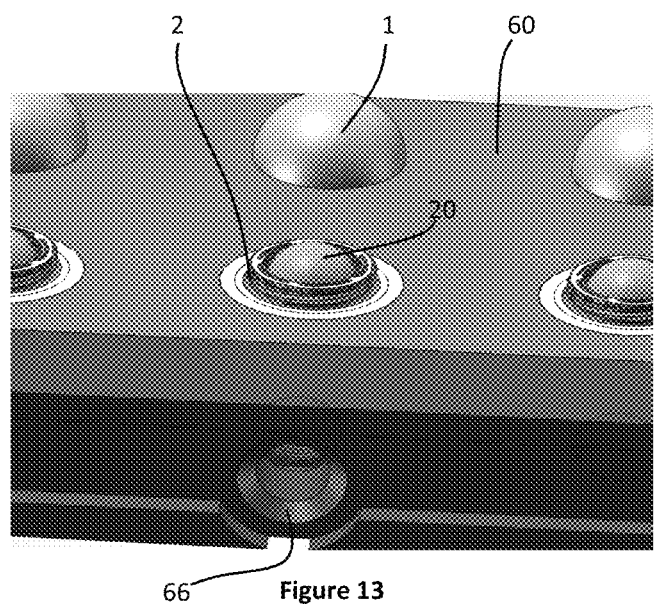
FIG. 13 illustrates two case parts of the open case for encasing a pearl received in the tray, and the pearl received in one of the two case parts.
Figure 14:
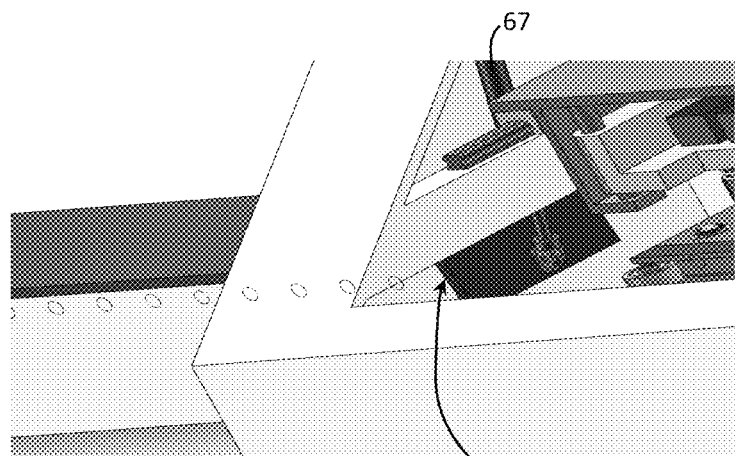
FIG. 14 shows a closed inlet hatchway between the front transitioning chamber and the encasing chamber of the apparatus.
Figure 15:
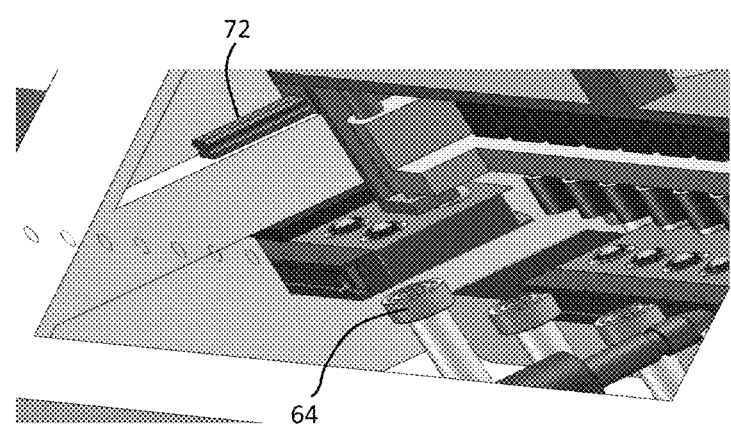
FIGS. 15 and 16 illustrate the tray being transferred into the encasing chamber of the apparatus via the hatchway, and a manipulator for handling the case to close the pearl within the case inside the encasing chamber.
Figure 16:
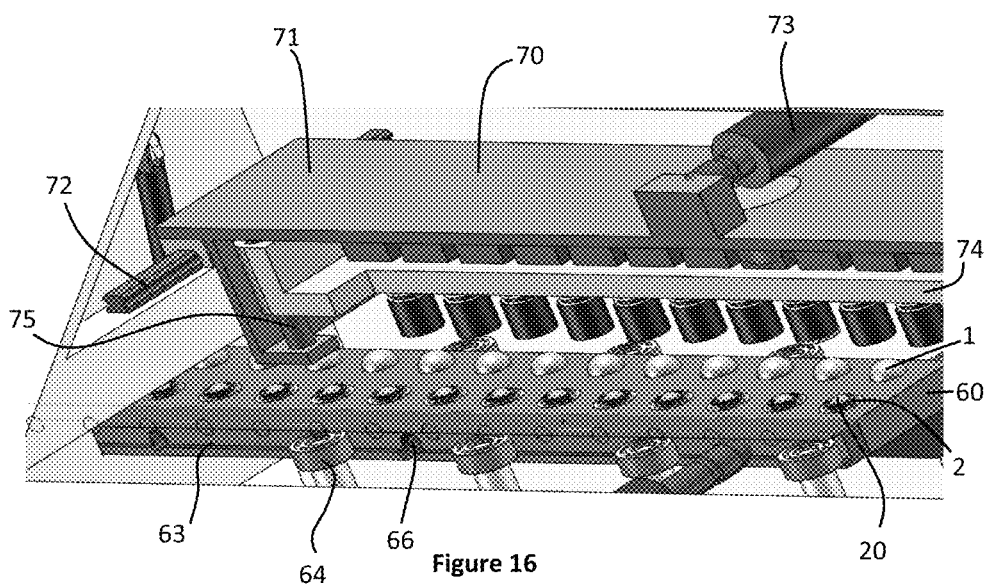

To place the pearl 20 and open case 100 in the encasing chamber 51, the apparatus 50 preferably comprises a front transitioning chamber 52. The pearl and open case is placed in the transitioning chamber 52, as shown in FIG. 11. The transitioning chamber is initially closed/separated from the encasing chamber. Once received in the front transitioning chamber, the transitioned chamber is closed, and the transitioning chamber is purged of air by an inert gas supply, such as supply 54. An inert atmosphere is maintained in the encasing chamber 51. Once an inert atmosphere has been achieved inside the transitioning chamber 52, the front transitioning chamber 52 is fluidly connected to the encasing chamber 51. In the illustrated embodiment, the chambers 51, 52 are fluidly connected via an entry hatchway. FIG. 14 shows the hatchway 58 closed and sealed to separate the chambers 51, 52, and FIG. 15 shows the hatchway 58 open so that the two chambers 51, 52 are connected. The hatchway 58 is moved between the closed and seal position and the open position by an actuator 67, such as a pneumatic actuator. When the hatchway is open the pearl and open case are transferred from the front transitioning chamber to the encasing chamber via the hatchway. Once the pearl and case have been received in the encasing chamber the hatchway is closed. Loading and purging of the front transitioning chamber is then repeated for a subsequent encasing operation.

Figure 22:
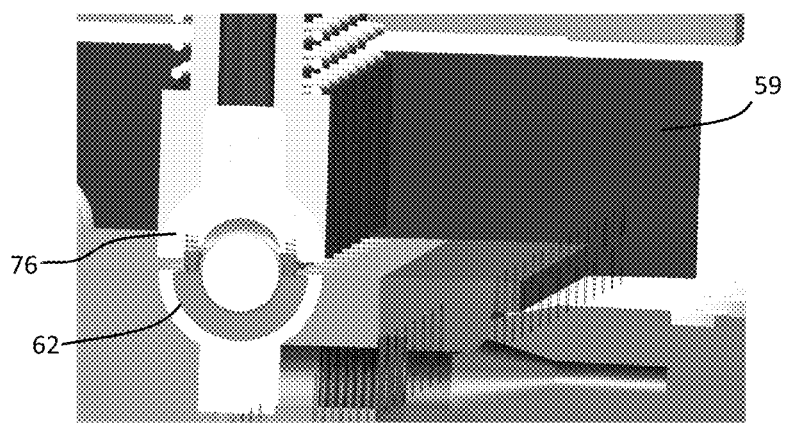
FIG. 22 illustrates the manipulator engaging the case first part with the case second part.
Figure 24:
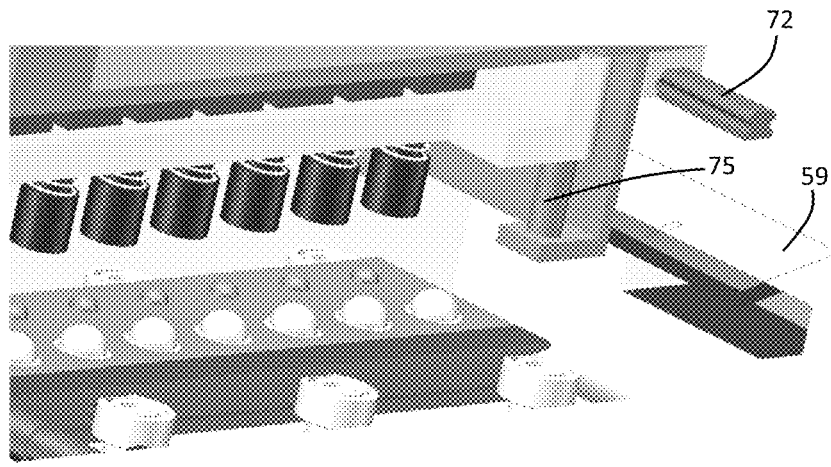
FIG. 24 illustrates an exit hatchway between the encasing chamber and the back transitioning chamber open.
Figure 25:
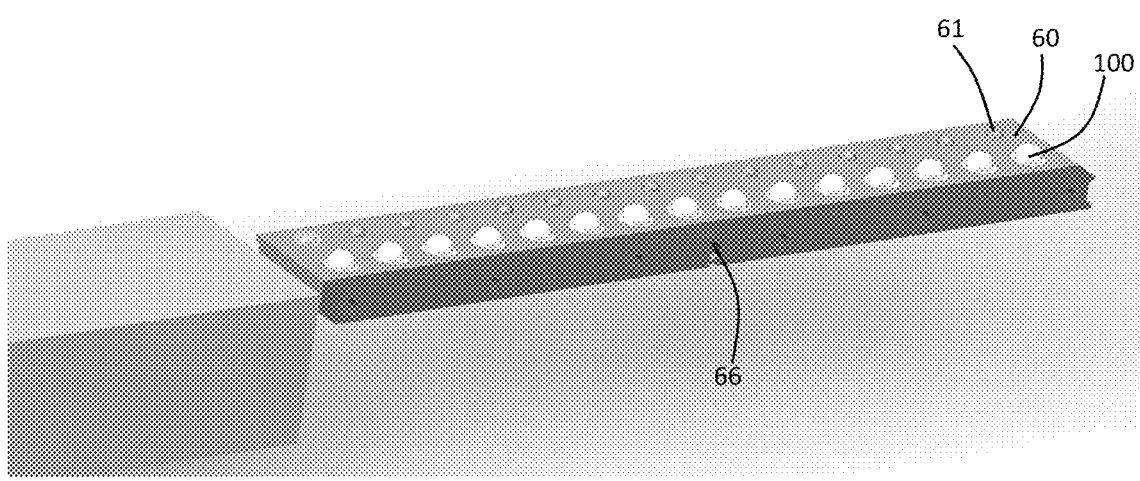
FIG. 25 illustrates the tray carrying the encased pearls removed from the apparatus.

To remove the pearl 20 and closed and sealed case 100 from the encasing chamber, the apparatus 50 preferably comprises a back transitioning chamber 53. The back transitioning chamber 53 is closed and purged of air by an inert gas supply, such as supply 54. Once an inert atmosphere has been achieved inside the back transitioning chamber 53 and the pearl encasing operation has been completed in the encasing chamber 51, the back transitioning chamber 53 is fluidly connected to the encasing chamber 51. In the illustrated embodiment, the chambers 51, 53 are fluidly connected via an exit hatchway 59. FIG. 22 shows the hatchway 59 closed and sealed to separate the chambers 51, 53, and FIG. 24 shows the hatchway 59 open so that the two chambers 51, 53 are connected. The hatchway 59 is moved between open and closed by an actuator, e.g. a pneumatic actuator. When the hatchway is open the pearl and closed case are transferred from encasing chamber 51 to the back transitioning chamber 53 via the open hatchway 59. Once the pearl 20 and case 100 have been received in the back transitioning chamber 53 the hatchway 59 is closed. The back transitioning chamber is then opened so that the encased pearl 20, 100 may be removed from the apparatus 50.

Preferably the apparatus is adapted to process a plurality of pearls simultaneously. In the illustrated embodiment, the apparatus is adapted to handle 15 pearls simultaneously, however any number of pearls can be envisaged, including many more than 15.

The pearls 20 are preferably supported in a tray 60. The tray has a number of recesses 62 (refer FIG. 21) to receive and hold/position one of the case parts 1, 2 of the case 100. One case part 2 is received within the recess 62 of the tray with the inside of the part 2 arranged upwardly to receive the pearl 20 to an inside of the case part 2. The other case part 1 is arranged with the inside of the case part 1 facing downwardly. The tray may comprise a projection 61 (refer FIG. 21) on which the case part 1 is positioned. The pearl is received in the upwardly arranged case part 2.

The apparatus comprises a device to move the tray 60 from the front transitioning chamber to the encasing chamber. The device may comprise a chain drive or other actuator to move the tray. The device may be located under the tray and is obscured from view in the Figures. Guides are preferably provided to guide and position the tray correctly once received in the encasing chamber. In the illustrated embodiment the tray has side rails 63 and guide 64 to engage the side rails are provided in the encasing chamber. The guides 64 comprise bearing elements to provide a low friction contact with the tray 60. The tray 60 moves horizontally into the encasing chamber.

Figure 17:
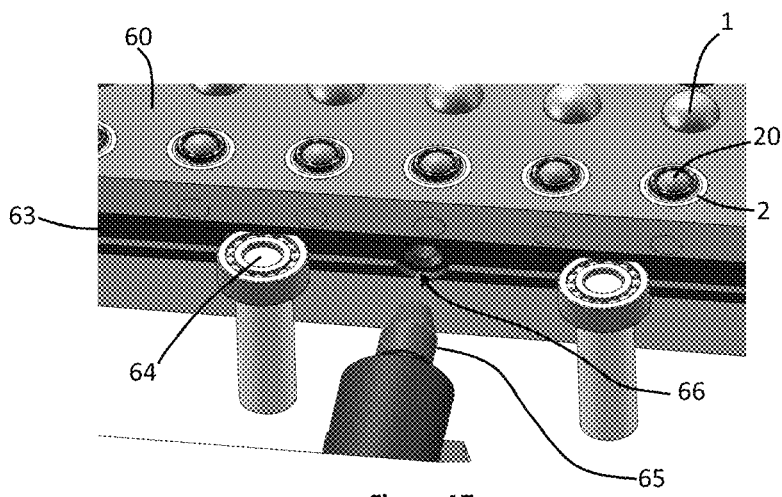
FIG. 17 illustrates a port of the tray and a nozzle of a pneumatic system to engage the port to apply a negative pressure to recesses of the tray to secure a case part received in the recess.
Figure 18:
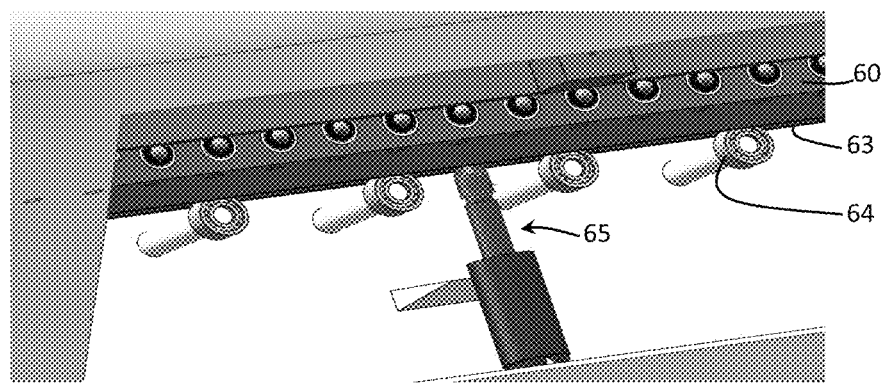
FIG. 18 illustrates the nozzle received in the port of the tray to apply a negative pressure to the tray recesses.
Figure 19:
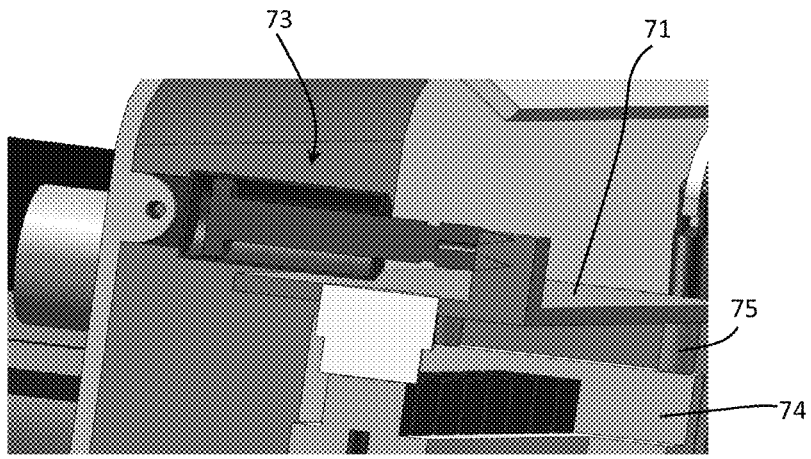
FIG. 19 illustrates an actuator to move a frame of the manipulator.

The upwardly facing case part 2 is preferably secured within the recess of the tray. With reference to FIGS. 17 and 18, the illustrated embodiment employs pneumatic pressure to secure the part 2 in the tray 60. Once the tray 60 has been received in the encasing chamber 51, a pneumatic nozzle/needle 65 is actuated to engage a corresponding port 66 on the tray. FIG. 17 shows the nozzle 65 spaced from the port 66 and FIG. 18 shows the nozzle 65 engaged with the port 66. The tray includes conduits/ports extending between the nozzle port 66 and the recess(es) 62. A pneumatic pump 56 provides a negative pressure via the nozzle and port 65, 66 to the recess 62 to suck the case part 2 to the recess 62 so that the case part is secured against movement.

The apparatus 50 comprises a manipulator 70 to handle the case part 1 and close the first and second parts 1, 2. The manipulator 70 is adapted to move between the first and second parts so that the first part can be moved to the second part to close the two parts together. In the illustrated embodiment, the manipulator comprises a frame 71 slidable on rails 72. The manipulator rails 72 are orthogonal to the tray rails 63. The frame is moved between the first and second parts by an actuator 73 visible in FIGS. 16 and 19. Actuator 73 may be a pneumatic actuator. The frame 71 is moved in a horizontal direction between the first and second case parts 1, 2 on horizontal rails 72.

Figure 23:
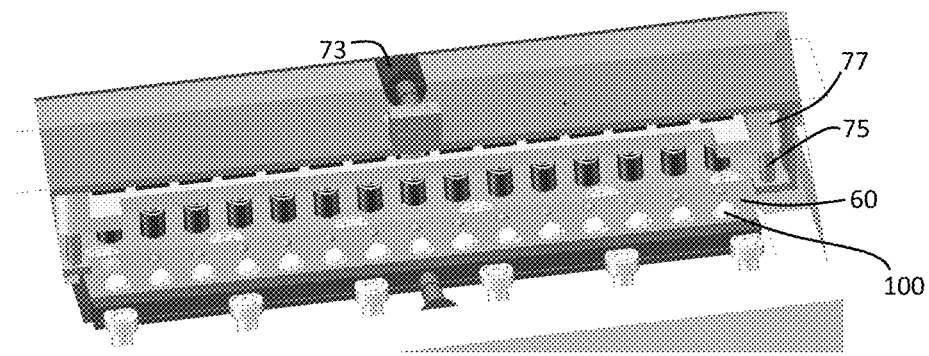
FIG. 23 illustrates the manipulator retracted from the encased pearl.

The frame 71 carries a second frame 74. The second frame is carried by the first frame 71 to slide on guides 75 visible in FIGS. 16 and 24. Guides 75 allow the second frame 74 to move vertically. An actuator 77 (e.g. as indicated in FIG. 23) moves the second frame on the first frame.

Figure 20:
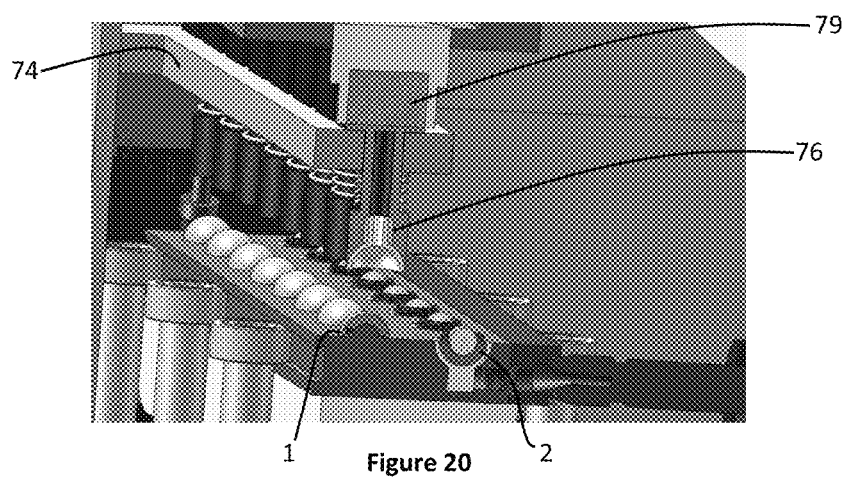
FIG. 20 illustrates the manipulator aligned with a case first part.
Figure 21:
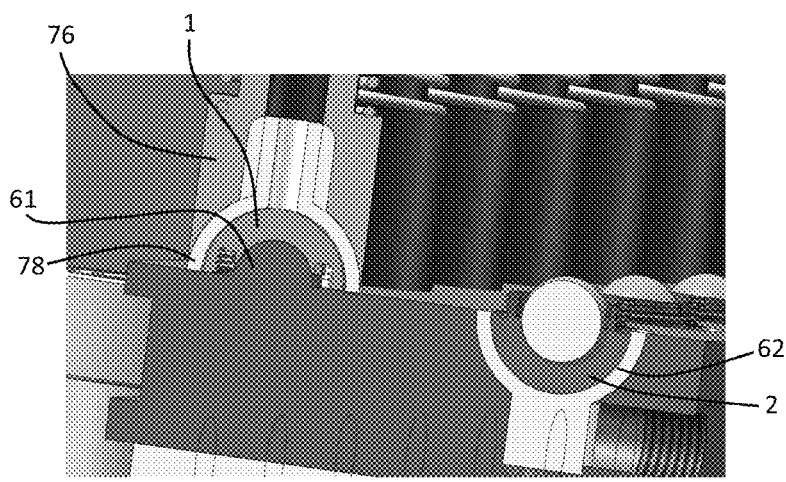
FIG. 21 illustrates a pickup of the manipulator engaging the case first part.

The manipulator comprises a pickup to capture the case first part 1. FIG. 20 shows the pickup 76. In the illustrated embodiment, the pickup comprises a suction cup 78. When the manipulator is aligned with the first case part on the tray 60 by movement of frame 71, as shown in FIG. 20, the pickup extends, for example by the movement of the second frame 74 on guides 75, until the case first part 1 is received in the pickup, as shown in FIG. 21. The pickup secures the case first part, in this case by applying a negative pneumatic pressure to the cup to suck the case first part to the pickup. The pneumatic pressure supply 56 provides the negative pressure to the cup. The manipulator then moves the case first part 1 to align with the case second part to close the case. For example, the manipulator raises the case first part by vertical movement of the second frame 74, and then moves the case first part horizontally by horizontal movement of the first frame 71, so that the case first part is vertically above and aligned with the case second part 2. The manipulator then lowers the case first part onto the case second part via vertical movement of the second frame, to engage the first and second parts 1, 2, as shown in FIG. 22. In the illustrated embodiment the first and second parts 1, 2 are threaded together to close the case. The pickup is provided with a rotary mechanism 79 to rotate and extend the pickup to thread the first part to the second part to close the case.

Once the case is closed, the pickup releases the case. In the illustrated embodiment, the manipulator moves the pickup vertically on second frame 74, as shown in FIG. 23. The manipulator may return to a position ready to receive the first part of a case in a subsequent pearl encasing operation, i.e. the position shown in FIG. 20. The tray is then transferred from the encasing chamber to the back transitioning chamber as described above and as shown in FIGS. 24 and 25. The tray 60 may be reused in a subsequent encasing operation be loading the tray with cases and pearls ready to be reloaded into the front transitioning chamber.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A protective case for a pearl, the case comprising:
 a wall defining a closed internal volume for containing a pearl when the case is closed,
 a first case part and a second case part, the first and second case parts each forming a substantial wall portion of the wall of the case, the first and second case parts adapted to be releasably closed together to define the closed internal volume, and each of the first and second case parts formed from a transparent material;
 an irreversible locking mechanism adapted to lock the first and second case parts together when closed and prevent the first and second case parts from being opened, such that the locking mechanism must be broken to open the case;
 wherein the locking mechanism comprises at least one tooth and at least one lever, when closing the case the lever riding over the tooth without damaging the locking mechanism, and wherein opening the case breaks the at least one tooth and/or the at least one lever; and
 wherein the locking mechanism is located inside the case and is visible through the transparent material of at least one of the first and second case parts so that a state of the locking mechanism is discernible from an outside of the case, the state of the locking mechanism being either unbroken or broken.

2. The case as claimed in claim 1, wherein the case comprises a coupling mechanism adapted to releasably close the first and second case parts together to define the closed internal volume.

3. The case as claimed in claim 2, wherein the first and second case parts are adapted to be releasably coupled together to close the case and are separated to open the case.

4. A case as claimed in claim 3, wherein the coupling mechanism comprises a threaded engagement and the locking mechanism is broken as the first and second case parts are unthreaded to open the case.

5. A case as claimed in claim 1, wherein an external surface of the case is substantially spherical.

6. A case as claimed in claim 1, wherein an external surface of each of the first and second case parts is substantially hemispherical.

7. A case as claimed in claim 1, wherein one of the first and second case parts comprises the at least one tooth and the other one of the first and second case parts comprises the at least one lever.

8. A case as claimed in claim 7, wherein the at least one tooth is integrally formed with one of the first and second case parts.

9. A case as claimed in claim 7, wherein the at least one lever is integrally formed with the other one of the first and second case parts.

10. A case as claimed in claim 1, wherein the locking mechanism comprises a plurality of teeth.

11. A case as claimed in claim 1, wherein the locking mechanism comprises a plurality of levers.

12. A case as claimed in claim 9, wherein the locking mechanism comprises a ratchet, one of the first and second case parts comprises a ratchet gear comprising the plurality of teeth and the other one of the first and second case parts comprises said at least one lever to engage the teeth of the gear.

13. A case as claimed in claim 12, wherein the case comprises a unique identifier.

14. A case as claimed in claim 1, wherein the case comprises a seal to limit or prevent contaminants reaching an inside of the case.

15. A case as claimed in claim 14, wherein the seal is a pressure or airtight seal, to maintain a controlled atmosphere inside the case.

16. A case as claimed in claim 1, wherein the case is adapted to contain a single pearl only.

17. A pearl and a case, the case as claimed in claim 1, wherein the case is closed with the pearl inside the case.

18. A pearl and a case as claimed in claim 17, wherein the pearl is encased in an inert atmosphere inside the case.

* * * * *